UNITED STATES PATENT OFFICE.

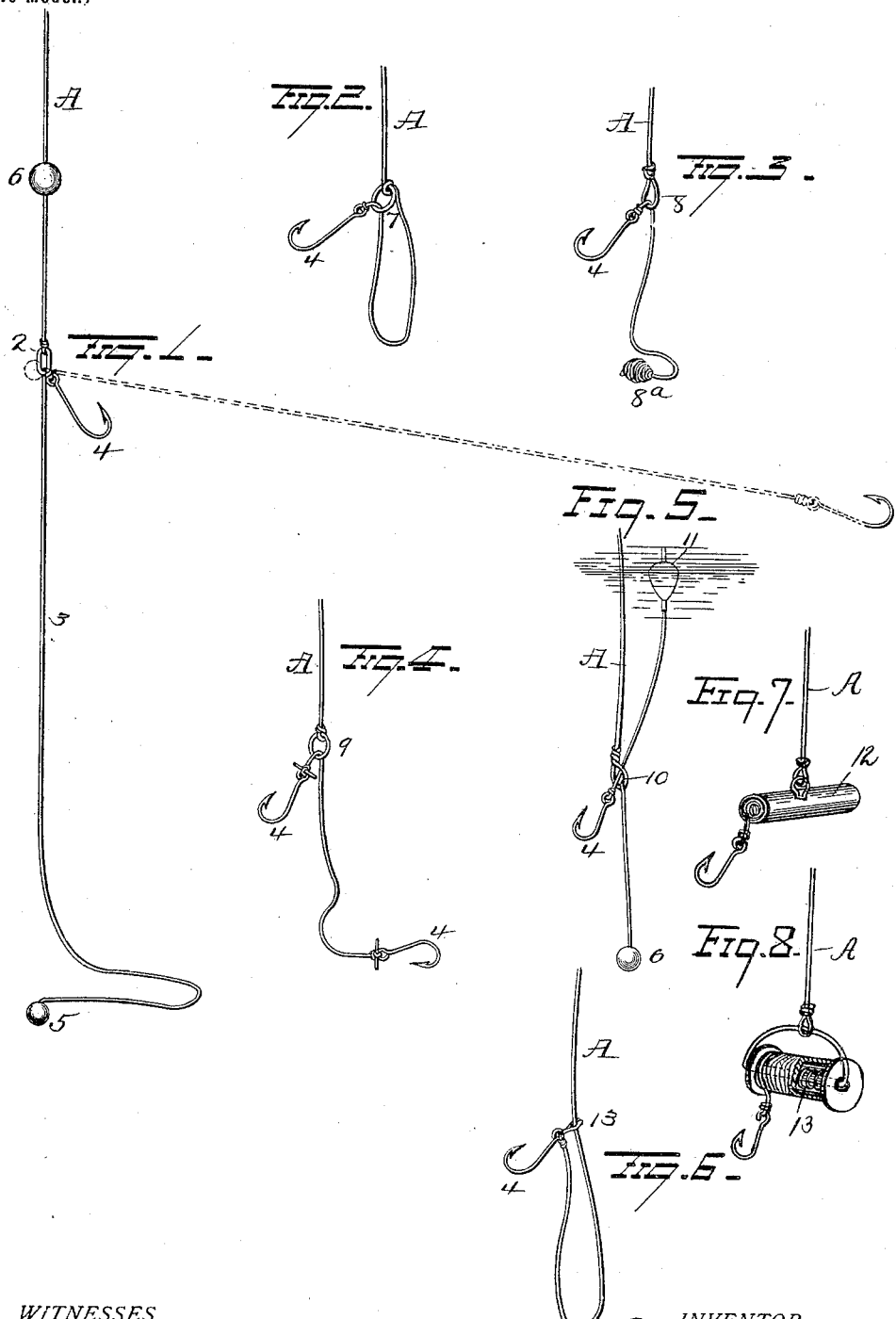

JAMES YELVERTON PAYTON, OF WALDRON, ARKANSAS, ASSIGNOR OF ONE-HALF TO CHARLES SANDERS MORRIS, OF SAME PLACE.

FISHING-LINE.

SPECIFICATION forming part of Letters Patent No. 676,962, dated June 25, 1901.

Application filed June 27, 1900. Serial No. 21,790. (No model.)

*To all whom it may concern:*

Be it known that I, JAMES YELVERTON PAYTON, of Waldron, in the county of Scott and State of Arkansas, have invented certain new and useful Improvements in Fishing-Lines; and I do hereby declare the following to be a full, clear, and exact description of the invention, such as will enable others skilled in the art to which it appertains to make and use the same.

My invention relates to an improvement in fishing-tackle, the object being to provide means for supporting a hook in such manner that when it is engaged by a fish the hook will be free to move a suitable distance without in any wise being retarded, thus allowing the fish ample time to swallow the bait before meeting with resistance.

With this end in view my invention consists in certain novel features of construction and combinations of parts, as will be hereinafter more fully decribed, and pointed out in the claims.

In the accompanying drawings, Figure 1 represents a view of my improvement. Figs. 2, 3, 4, 5, 6, 7, and 8 are views of modified forms of same.

In the construction shown in Fig. 1, A represents the main line, provided at its lower end with an eyelet or loop 2, in which is loosely supported the auxiliary line 3, carrying at one end a hook 4 and at its opposite end a sinker 5, the latter being somewhat heavier than the hook, so as to normally hold the hook up in a position adjacent to the eyelet. With this construction it will be seen that when the line is in use the hook 4 is located between the sinker 6 on the main line A and the lighter sinker 5 on the end of the auxiliary line 3, the auxiliary line simply working through the eyelet 2 on the main line. With this arrangement if the bait be grasped by a fish he will be at liberty to travel a limited distance, sufficient to reassure himself that the bait is free. When the line is used with the sinker 5 on the lower end of the auxiliary line resting on the river-bottom, the auxiliary line will be slack and not offer even the resistance of the sinker to the free movement of the hook, and when the line is used with the sinker 5 above the bottom the free movement of the hook will be retarded simply by the weight of the said sinker 5, which, as previously explained, should be only heavy enough to overcome the weight of the hook and its bait. After the fish satisfies himself that the bait is free he proceeds to swallow it, and from actual practice it has been found that he generally has the hook well secured in his mouth before being brought to a stop by the contact of sinker 5 with the eyelet or loop 2.

In the construction shown in Fig. 2 instead of using an auxiliary line I provide the main line with a loop or eyelet 7 at a point above its lower end and attach the hook to the extreme lower end of the line. The hook is then passed up through the loop or eyelet and when baited rests in the position shown, thus providing ample slack below the loop or eyelet for the free movements of the fish after striking the bait and up to the time he swallows it.

In Fig. 3 I have shown the main line with a loop or eyelet 8 at its lower end, one end of the auxiliary line having a knot $8^a$ therein, while the other end is provided with a hook. In this construction the knot simply operates to prevent the auxiliary line from becoming detached from the main line and offers less resistance to the free movements of the fish than the sinker 5.

Fig. 4 shows the auxiliary line with a hook at each end and loosely mounted in a loop or eyelet 9, attached to the main line, while in Fig. 5 I have shown the main line provided with a loop or eyelet 10 at a point above its sinker 6 and the auxiliary line provided with a cork or float 11 for holding the hook in a position adjacent to the eyelet.

In Fig. 6 the auxiliary line is formed by forming a simple fold in the main line, the adjacent members of the main line being detachably held together by a clamp 13, which latter may be permanently carried by either the hook or main line.

Other means than those above described might be used for providing the slack line essential to this invention—as, for instance, the auxiliary line might be coiled within a tube 12, as shown in Fig. 7, said tube being carried on the end of the main line and acting as a sinker, or it might be wound around a spring drum or pulley 13, located within the sinker, as shown in Fig. 8. Various other slight changes might be made without departing from the spirit of my invention, and hence I would have it understood that I do not confine myself to the precise details of construction herein set forth, but consider myself at liberty to make such changes and alterations as fairly fall within the spirit and scope of my invention.

Having fully described my invention, what I claim as new, and desire to secure by Letters Patent, is—

1. In a fishing-line, the combination with a main line having an eyelet or loop, of an auxiliary line carrying a hook and passing loosely through the eyelet or loop, the said auxiliary line being adapted to be moved freely longitudinally through the eyelet or loop.

2. The combination with a main line carrying a sinker and an eyelet below the sinker, of an auxiliary line loosely suspended from the eyelet and adapted to be moved freely longitudinally therein.

3. An attachment for fishing-lines comprising a loop or eye, an auxiliary line passing freely through said loop or eye and provided with a hook and means for preventing the escape of the auxiliary line from the eye or loop.

4. The combination with a line and a hook, of a flexible connection between the hook and the line and means substantially as described for holding a portion of said flexible connection normally slack.

5. An attachment for fishing-lines, comprising a loop or eyelet and a line passing freely through same, the said line having a hook at one end and an enlargement at its other end, substantially as set forth.

In testimony whereof I have signed this specification in the presence of two subscribing witnesses.

JAMES YELVERTON PAYTON.

Witnesses:
D. A. EDWARDS,
P. J. CABELL.